United States Patent [19]

Henseleit et al.

[11] Patent Number: 5,164,232
[45] Date of Patent: Nov. 17, 1992

[54] INK COMPOSITIONS

[75] Inventors: Kerstin M. Henseleit, Toronto; Marcel P. Breton, Mississauga; Irena Koziol, Port Qoqutlam; Raymond W. Wong, Mississauga; Melvin D. Croucher, Oakville, all of Canada

[73] Assignee: Xerox Corporation, Stamford, Conn.

[21] Appl. No.: 653,390

[22] Filed: Feb. 11, 1991

[51] Int. Cl.$^5$ .................. B05D 1/02; C09D 11/02
[52] U.S. Cl. .................. 427/288; 106/22 R; 106/20 D; 346/1.1; 427/421
[58] Field of Search .................. 106/22, 23, 30, 20; 523/161; 346/1.1; 427/288, 421

[56] References Cited

U.S. PATENT DOCUMENTS

| | | | |
|---|---|---|---|
| 2,052,029 | 8/1936 | Harris | 260/99.20 |
| 2,128,946 | 9/1938 | Katzman | 260/461 |
| 2,324,550 | 7/1943 | Wolfe | 106/30 |
| 4,001,164 | 1/1977 | Chu | 260/31.8 N |
| 4,165,399 | 8/1979 | Germonprez | 106/22 |
| 4,229,747 | 7/1980 | Hwang | 346/1.1 |
| 4,259,675 | 3/1981 | Mansukhani | 346/1 |
| 4,421,559 | 12/1983 | Owatari | 106/20 |
| 4,695,846 | 9/1987 | Suzuki | 346/1.1 |
| 4,702,742 | 10/1987 | Iwata et al. | 106/22 |
| 4,762,568 | 8/1988 | Nakamura et al. | 106/23 |
| 4,959,661 | 9/1990 | Buxton et al. | 106/23 |
| 5,010,125 | 4/1991 | Kruse et al. | 106/30 |

FOREIGN PATENT DOCUMENTS 0425150 2/1991 European Pat. Off. .
3132247 9/1982 Fed. Rep. of Germany .
60-49771 6/1981 Japan .

OTHER PUBLICATIONS

Arisawa, Katsuji et al. Oil based recording inks for ink-jet printing CA 109:192371k.
Shoji Koike et al. Ink-jet printing CA:109:192362h.
"McCutcheon's Emulsifiers & Detergents", 1982 North American Ed., 1984, pp. 253 and 254.
IBM Technical Disclosure Bulletin, vol. 25, No. 2, Jul. 1982, Acitelli et al., "Infrared Flourescent Ink Jet Ink".
IBM Technical Disclosure Bulletin, vol. 24, No. 2, Jul. 1981, Bailey et al., "Jet Ink Containing Dimethieone Copolyol".
IBM Technical Disclosure Bulletin, vol. 18, No. 4, Sep. 1975, Edds et al., "Void Displacement Fast-Drying Process For Ink Jet Printer Ink".

Primary Examiner—Shrive Beck
Assistant Examiner—Helene Klemanski
Attorney, Agent, or Firm—Judith L. Byorick

[57] ABSTRACT

Disclosed is an ink composition which comprises an aqueous liquid vehicle, a colorant, and a phosphate ester. The ink is particularly suitable for ink jet printing processes, especially thermal ink jet printing processes. The inks exhibit low viscosities and rapid drying times, particularly on plain paper. Also disclosed is a process for generating images onto a substrate which comprises incorporating an ink composition which comprises an aqueous liquid vehicle, a colorant, and a phosphate ester into an ink jet printing apparatus and causing droplets of the ink composition to be ejected in an imagewise pattern onto the substrate.

19 Claims, No Drawings

INK COMPOSITIONS

BACKGROUND OF THE INVENTION

The present invention is directed to ink compositions. More specifically, the present invention is directed to aqueous ink compositions exhibiting rapid drying times that are particularly suitable for use in ink jet printing processes. One embodiment of the present invention is directed to an ink composition which comprises an aqueous liquid vehicle, a colorant, and a phosphate ester.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles necessary for high resolution printing, and physical limitations of the transducer result in low ink drop velocity. Low drop velocity seriously diminishes tolerances for drop velocity variation and directionality, thus impacting the system's ability to produce high quality copies, and also decreases printing speed. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and U.S. Pat. No. 4,532,530, the disclosures of each of which are totally incorporated herein by reference.

Inks suitable for ink jet printing processes are known. For example, U.S. Pat. No. 4,695,846 (Suzuki), the disclosure of which is totally incorporated herein by reference, discloses an ink jet recording process for recording colored images using at least two kinds of inks different from one another in dye concentration to express one color, wherein the inks are toned so that hues given by the inks are continuous. The inks employed for the disclosed process generally comprise a dye and a solvent generally composed primarily of water and a wetting agent such as a glycol or other water-soluble organic solvent. The inks can also contain a surfactant. Japanese Patent Publication 56-49771 discloses inks for ink jet recording that comprise water soluble direct dyes, glycerol and optionally other polyhydric alcohols, N-methyl-2-pyrrolidone, and a surfactant which has a surface tension of 30 dynes per centimeter or less at the micelle concentration in water. In addition, U.S. Pat. No. 4,165,399 (Germonprez) discloses binderless ink compositions suitable for use in ink jet printing operations on polymeric resin surfaces to form images which are highly resistant to abrasion and to steam pasteurization conditions by virtue of penetration of the colorant into the sub-surface structure of the resin. The inks generally contain a basic or neutral dye, a water and alcohol solvent system, a surfactant, an aliphatic ketone or ester, and optionally an aliphatic hydrocarbon of 8 to 12 carbons.

Further, U.S. Pat. No. 4,229,747 (Hwang), the disclosure of which is totally incorporated herein by reference, discloses an improved fast drying jet printing ink for use in jet drop printers and copiers which comprises an aqueous solution of a water soluble or solvent soluble dye, an organic chemical solvent comprising a glycol ether having 8 to 12 carbon atoms, a bridging agent for solubilizing the solvent and dye in solution comprising an ethoxylated higher alcohol amine-amide, a humectant, and a defoaming agent. In addition, U.S. Pat. No. 4,259,675 (Mansukhani) discloses an ink composition for use in continuous stream jet printing processes comprising an aqueous solution of a water soluble dye and a humectant consisting of at least one member of the group consisting of organic phosphonates and organic phosphites. U.S. Pat. No. 4,421,559 (Owatari), the disclosure of which is totally incorporated herein by reference, discloses an aqueous fluid ink suitable for use in an ink jet printer which includes urea, a water-soluble dye, water, and a humectant selected from aliphatic polyhydric alcohols and alkyl ether derivatives of the aliphatic polyhydric alcohols. The viscosity is maintained between about 2 and 3 centipoise at 20° C. and the ink is made quick drying by adjusting the pH to between about 12 and 13.5. Other publications disclosing ink jet ink formulations include *IBM Technical Disclosure Bulletin*, vol. 25, no. 2, page 518 (July 1982), *IBM Technical Disclosure Bulletin*, vol. 24, no. 2, page 920 (July 1981), and *IBM Technical Disclosure Bulletin*, vol. 18, no. 4, page 1099 (September 1975).

Other ink compositions are also known. For example, U.S. Pat. No. 2,324,550 (Wolfe) discloses a printing and lithographic ink containing a high percentage of solids and exhibiting rapid drying characteristics. The ink is designed for application to metal and similar non-absorbent surfaces at relatively high baking temperatures and comprises a vehicle consisting of a varnish type synthetic resin, a rapid drying and plasticizing oil of high iodine value, and a tri-alkyl phosphate, as well as a color pigment incorporated in the vehicle. The tri-alkyl phosphate functions as a solvent having the characteristic of rapid evaporation when the ink is baked at relatively high temperatures to leave a tenaciously adhesive ink film on the metal surface. In addition, U.S. Pat. No. 4,001,164 (Chu) discloses a fast drying ink which contains a colorant, a non-volatile carrier, and a film forming material of the structure

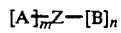

wherein A is a segment, non-polymeric or oligomeric, bearing one or more functional groups, Z is an organic linking radical, B is an oligomeric or polymeric segment, and m and n are 1, 2, or 3, the total not exceeding 4.

U.S. Pat. No. 2,128,946 (Katzman) discloses a tetraphosphate of an aliphatic polyhydroxy substance wherein the hydrogen of at least one hydroxy group of the aliphatic polyhydroxy substance is replaced by a radical selected from the group consisting of alkyl and acyl radicals. The material is useful as an interface modifier, to increase the oiliness of lubricating oils and greases, to act as an emulsifying agent, to reduce viscosity, and the like, and may be added to a bath containing an aqueous medium with or without additional substances, including dyes. In addition, U.S. Pat. No. 2,052,029 (Harris) discloses a phosphoric acid ester of a polyhydroxy substance having not less than four esterifiable hydroxy groups but not including hexahydric alcohols, the hydrogen of at least one of the hydroxy groups being replaced by a lipophile radical having at least four carbon atoms. The material is useful as an interface modifier, and may be added to a bath containing an aqueous medium with or without additional substances, including dyes.

Although known compositions are suitable for their intended uses, a need continues to exist for ink compositions suitable for use in ink jet printing processes. In addition, a need remains for ink compositions particularly suitable for thermal ink jet printing processes. Further, there is a need for ink compositions that exhibit rapid drying times. There is also a need for ink compositions that have low viscosity (generally no more than about 5 centipoise) and exhibit rapid drying times of less than about 15 seconds when used in thermal ink jet printing processes to generate images on plain paper. Additionally, there is a need for ink compositions that enable ink jet printing processes with increased output rates. Further, a need remains for ink compositions that enable rapid ink jet printing processes on paper substrates with no need for drying means such as heat, forced air, or the like. In addition, there is a need for ink compositions of low viscosity that enable the generation of high quality prints, particularly when used in thermal ink jet printing processes.

SUMMARY OF THE INVENTION

It is an object of the present invention to provide ink compositions suitable for use in ink jet printing processes.

It is another object of the present invention to provide, in addition, a need for ink compositions particularly suitable for thermal ink jet printing processes.

It is yet another object of the present invention to provide ink compositions that exhibit rapid drying times.

It is still another object of the present invention to provide ink compositions that have low viscosity (generally no more than about 5 centipoise) and exhibit rapid drying times of less than about 15 seconds when used in thermal ink jet printing processes to generate images on plain paper.

Another object of the present invention is to provide ink compositions that enable ink jet printing processes with increased output rates.

Yet another object of the present invention is to provide ink compositions that enable rapid ink jet printing processes on paper substrates with no need for drying means such as heat, forced air, or the like.

Still another object of the present invention is to provide ink compositions of low viscosity that enable the generation of high quality prints, particularly when used in thermal ink jet printing processes.

These and other objects of the present invention (or specific embodiments thereof) can be achieved by providing an ink composition which comprises an aqueous liquid vehicle, a colorant, and a phosphate ester. Another object of the present invention is directed to a process for generating images onto a substrate which comprises incorporating an ink composition which comprises an aqueous liquid vehicle, a colorant, and a phosphate ester into an ink jet printing apparatus and causing droplets of the ink composition to be ejected in an imagewise pattern onto the substrate.

DETAILED DESCRIPTION OF THE INVENTION

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The nonwater component of the liquid vehicle generally serves as a humectant which has a boiling point higher than that of water (100° C.). In the inks of the present invention, the liquid vehicle is generally present in an amount of from about 85 to about 99.5 percent by weight, and preferably from about 90 to about 99 percent by weight.

The colorant for the inks of the present invention can be a dye or mixture of dyes. Examples of suitable dyes include Food dyes such as Food Black No. 2, Food Red No. 40, Food Blue No. 1, Food Yellow No. 7, and the like, tetrasulfonic acid salts of phthalocyanine derivatives, including copper phthalocyanine derivatives, tetra sodium salts, tetra ammonium salts, tetra potassium salts, tetra lithium salts, and the like, Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodagaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); and the like. Typical preferred dyes Bernacid Red, available from Berncolors, Poughkeepsie, N.Y., Pontamine Brilliant Bond Blue, Berncolor A.Y. 34, Basacid Black X34, Carta Black 2GT, Telon Fast Yellow 4GL-175, and the like. The dye or mixture of dyes generally is soluble in the liquid vehicle, and is present in any effective amount. Typically, the total amount of dye in the ink compositions of the present invention is from about 1 to about 10 percent by weight, preferably from about 3 to about 7 percent by weight.

Also suitable as colorants for the inks of the present invention are pigments. Suitable pigments include carbon black, nigrosine dye, aniline blue, 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, copper tetra-4-(octadecyl sulfonamido) phthalocyanine, copper phthalocyanine pigment, listed in the Color Index as Cl 74160, Pigment Blue, Anthradanthrene Blue, identified in the Color Index as Cl 69810, Special Blue X-2137, diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Pigments are present in any effective amount in the ink, typically from about 1 to about 10 percent by weight of the ink, although lesser or greater amounts may be present provided that the objectives of the present invention are met. The ink colorant can also comprise a mixture of one or more dyes and one or more pigments.

The ink compositions of the present invention also contain a phosphate ester. Phosphate esters suitable for the present invention are of the general formula

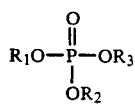

wherein $R_1$, $R_2$, and $R_3$ are independently selected from aliphatic hydrocarbon groups. Generally, the aliphatic hydrocarbon groups are of a size that enables the phosphate ester to exhibit solubility in water. Typically, $R_1$, $R_2$, and $R_3$ have from 1 to about 20 carbon atoms, and preferably from 1 to about 12 carbon atoms. Typical $R_1$, $R_2$, and $R_3$ groups include methyl, ethyl, n-propyl, isopropyl, hexyl, octyl, octyldecyl, dodecyl, isooctyl, and the like. One example of a suitable phosphate ester is Strodex PK90, available from Dexter Chemical Corporation, 845 Edgewater Road, Bronx, N.Y. Strodex PK90 contains 90 percent by weight of a phosphate ester of the above formula and from about 5 to about 7 percent by weight water, with the balance being isooctyl alcohol. Phosphate esters of the above formula are also commercially available from various manufacturers and under a variety of trade names. Further, phosphate esters of the above formula can also be prepared by known methods using $P_2O_5$, $POCl_3$, or $PCl_3$ as the phosphorylating agent along with an alcohol (such as lauryl tri(ethyleneoxy)ethanol, for example). The product resulting from the reaction of these two materials is then neutralized. When lauryl tri(ethyleneoxy)ethanol is the alcohol selected, the reaction mixture contains the following products: $C_{12}H_{25}[OCH_2CH_2]_4OPO(OH)_2$ (ONA monoester, largest fraction. $(C_{12}H_{25}[OCH_2CH_2]_4O)_2PO(OH)$ (ONA diester, second biggest fraction. $(C_{12}H_{25}[OCH_2CH_2]_4O)_3PO$ triester, small fraction.

The ink compositions of the present invention contain the phosphate ester in any effective amount, typically from about 0.09 to about 1.5 percent by weight, and preferably from about 0.18 to about 0.50 percent by weight.

Other additives can also be present in the inks of the present invention. For example, one or more surfactants or wetting agents can be added to the ink. These additives may be of the cationic, anionic, or nonionic types. Suitable surfactants and wetting agents include Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight.

Polymeric additives or dispersants can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like are particularly useful for stabilizing pigment particles in a water based liquid vehicle such as water or a mixture of water and a water miscible organic liquid. In addition, polymers such as hydroxypropyl polyethyleneimine (HPPEI-200) or other polyethylene imine derivatives can be added to the ink to improve waterfastness when a dye is used as the colorant. Polymeric stabilizers may be present in the ink of the present invention in amounts of from 0 to about 10 percent by weight, and preferably from about 0.01 to about 5 percent by weight.

Other optional additives to the inks of the present invention include biocides such as Dowicil 150, 200, and 75, ICl Proxel GXL benzoate salts, sorbate salts, and the like, present in an amount of from about 0.0001 to about 4 percent by weight, and preferably from about 0.01 to about 2.0 percent by weight, humectants such as ethylene glycol, diethyleneglycol, N-methylpyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight, pH controlling agents such as acids or, bases, phosphate salts, carboxylates salts, sulfite salts, amine salts, and the like, present in an amount of from 0 to about 5 percent by weight and preferably from about 0.01 to about 2 percent by weight, or the like.

The ink compositions of the present invention are generally of a viscosity suitable for use in thermal ink jet printing processes. Generally, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process, suitable for preparation of an ink with a dye colorant, entails mixing all of the ink ingredients together, heating the mixture to a temperature of from about 40° C. to about 55° C. for a period of from about 2 to about 3 hours, subsequently cooling the mixture to room temperature (typically from about 10° to about 35° C.), and filtering the mixture to obtain an ink. Inks containing pigment particles can be prepared by dispersing the pigment particles in the liquid vehicle and placing the dispersion in a high shear mixer, followed by adding additional ink ingredients and then classifying the ink particles by size, by methods such as centrifuging and-/or sonifying and/or filtration to remove excessively large pigment particles and obtain an ultrafine dispersion. If desired, all of the ink ingredients can be mixed together prior to the high shear mixing step instead of adding these ingredients subsequent to high shear mixing. Examples of high shear mixers include attritors, three-roll mills, sand mills, ball mills, roller mills, and the like. Typical grinding times are from about 8 to about 16 hours to disperse the pigment particles. If desired, the phosphate ester ingredient can be added to the mixture of liquid vehicle and pigment particles prior to high shear mixing.

The present invention is also directed to a process which entails incorporating an ink composition which comprises an aqueous liquid vehicle, a colorant, and a phosphate ester into an ink jet printing apparatus and causing droplets of the ink composition to be ejected in an imagewise pattern onto a substrate. In a particularly preferred embodiment, the printing apparatus employs a thermal ink jet process. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entials printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

COMPARATIVE

An ink composition was prepared by mixing together 3 parts by weight of Food Black #2 dye (obtained from Bayer AG, Leverkusen), 10 parts by weight of polyethylene glycol (molecular weight 400), 5.25 parts by weight of diethylene glycol, and 81.75 parts by weight of deionized water. The ingredients were heated to a temperature of 50° C. for a period of 2 hours and were then cooled. The resulting ink composition had a viscosity of 2.14 centipoise. This ink was incorporated into a thermal ink jet printing test fixture comprising a modified Xerox ® 4020 printer equipped with a 48 nozzle printhead capable of generating 300 spots per inch and incorporated into an HP-Deskjet printer capable of generating 300 spots per inch. Images were generated on two Xerox ® 4024 grade papers, namely paper 10—Brazil XED518 and paper 10 smooth—Port Edwards—82491-106 (both commercially available from Xerox Corporation). The drying times in seconds on both the felt side and the wire side of each of these papers were as follows:

| 10 Smooth PE-82491-106 | | Brazil XED518 | |
|---|---|---|---|
| Felt Side | Wire Side | Felt Side | Wire Side |
| 46 sec. | 25 sec. | 20 sec. | 21 sec. |

Drying times were measured by generating a solid square image 1 inch × 1 inch, followed by measuring the time until no smearing was observed when the square was brushed with a Q-tip ®.

EXAMPLE II

An ink composition was prepared by mixing together 3 parts by weight of Food Black #2 dye (obtained from Bayer AG Leverkusen), 10 parts by weight of polyethylene glycol (molecular weight 400), 80.25 parts by weight of dionized water, and 1.5 parts by weight of a phosphate ester (Strodex PK90, obtained from Dexter Chemical Corporation, 845 Edgewater Road, Bronx, N.Y. 10474). The ingredients were heated to a temperature of 50° C. for a period of 2 hours and were then cooled. The resulting ink composition had a viscosity of 2.34 centipoise. This ink was incorporated into a thermal ink jet printing test fixture comprising a modified Xerox ® 4020 printer equipped with a 48 nozzle printhead capable of generating 300 spots per inch. Images were generated on two Xerox ® 4024 grade papers, namely paper and paper 10—Brazil XED518 and paper 10 smooth—Port Edwards—82491-106 (both commercially available from Xerox Corporation). The drying times in seconds on both the felt side and the wire side of each of these papers was as follows:

| Brazil XED518 | | 10 Smooth PE-82491-106 | |
|---|---|---|---|
| Felt Side | Wire Side | Felt Side | Wire Side |
| 1 sec. | 1 sec. | 1 sec. | 1 sec. |

As can be seen, the drying times are significantly improved on both sides of both papers compared to the drying times for the ink containing no phosphate ester as illustrated in Example I. Drying times were measured by generating a solid square image 1 inch × 1 inch, followed by measuring the time until no smearing was observed when the square was brushed with a Q-tip ®.

EXAMPLE III

An ink composition was prepared by mixing together 3 parts by weight of Food Black #2 dye (obtained from Bayer AG, Leverkusen), 5.25 parts by weight of diethylene glycol, 81.65 parts by weight of deionized water, and 1.5 parts by weight of a phosphate ester (Strodex PK 90). The ingredients were heated to a temperature of 50° C. for a period of 2 hours and were then cooled. The resulting ink composition had a viscosity of 1.19 centipoise. This ink was incorporated into a thermal ink jet printing test fixture comprising a modified Xerox ® 4020 printer equipped with a 48 nozzle printhead capable of generating 300 spots per inch. Images were generated on two Xerox ® 4024 grade papers, namely paper and paper 10—Brazil XED518 and paper 10 smooth—Port Edwards—82491-106 (both commercially available from Xerox Corporation). The drying times in seconds on both the felt side and the wire side of each of these papers was as follows:

| Brazil XED518 | | 10 Smooth PE-82491-106 | |
|---|---|---|---|
| Felt Side | Wire Side | Felt Side | Wire Side |
| 1 sec. | 1 sec. | 1 sec. | 1 sec. |

As can be seen, the drying times are significantly improved on both sides of both papers compared to the drying times for the ink containing no phosphate ester as illustrated in Example I.

EXAMPLE IV

An ink composition was prepared by mixing together 3 parts by weight of Food Black #2 dye (obtained from Bayer AG, Leverkusen), 10 parts by weight of polyethylene glycol (molecular weight 400), 5.25 parts by weight of diethylene glycol, 82 parts by weight of deionized water, and 0.24 parts by weight of a phosphate ester (Strodex PK 90). The ingredients were heated to a temperature of 50° C. for a period of 2 hours and were then cooled. The resulting ink composition had a viscosity of 2.07 centipoise. This ink was incorporated into a thermal ink jet printing test fixture comprising a modified Xerox ® 4020 printer equipped with a 48 nozzle printhead capable of generating 300 spots per inch. Images were generated on two Xerox ® 4024 grade papers, namely paper and paper 10—Brazil XED518 and paper 10 smooth—Port Edwards—82491-106 (both commercially available from Xerox Corporation). The drying times in seconds on both the felt side and the wire side of each of these papers was as follows:

| 10 Smooth PE-82491-106 | | Brazil XED518 | |
| --- | --- | --- | --- |
| Felt Side | Wire Side | Felt Side | Wire Side |
| 8 sec. | 14 sec. | 11 sec. | 16 sec. |

As can be seen, the drying times are significantly improved on both sides of both papers compared to the drying times for the ink containing no phosphate ester as illustrated in Example I.

EXAMPLE V

An ink composition was prepared by mixing together 3.0 parts by weight of Food Black #2 dye (obtained from Bayer AG, Leverkusen), 82 parts by weight of deionized water, and 0.24 parts by weight of a phosphate ester (Strodex PK 90). The ingredients were heated to a temperature of 50° C. for a period of 2 hours and were then cooled. The resulting ink composition had a viscosity of 1.12 centipoise. This ink was incorporated into a thermal ink jet printing test fixture comprising a modified Xerox ® 4020 printer equipped with a 48 nozzle printhead capable of generating 300 spots per inch. Images were generated on two Xerox ® 4024 grade papers, namely paper and paper 10—Brazil XED518 and paper 10 smooth—Port Edwards—824-91—106 (both commercially available from Xerox Corporation). The drying times in seconds on both the felt side and the wire side of each of these papers was as follows:

| Brazil XED518 | | 10 Smooth PE-82491-106 | |
| --- | --- | --- | --- |
| Felt Side | Wire Side | Felt Side | Wire Side |
| 7 sec. | 15 sec. | 12 sec. | 13 sec. |

As can be seen, the drying times are significantly improved on both sides of both papers compared to the drying times for the ink containing no phosphate ester as illustrated in Example I.

EXAMPLE VI

A pigment dispersion was prepared by adding 30 parts by weight of Hostaperm Pink E (pigment, obtained from American Hoechst Corporation), 7.5 parts by weight of Lomar D (dispersant, obtained from Diamond Shamrock Corporation) and 200 parts by weight of deionized water to a 01 Attritor (obtained from Union Process). The dispersion was attrited at 25° C. for 16 hours to disperse and break down the pigment particles to submicron size. The pigment dispersion was then diluted to 6 percent w/w by adding additional deionized water.

An ink composition was prepared by mixing 10 parts by weight of ethylene glycol, 90 parts by weight of the 6% pigment dispersion at room temperature, and 1.0 parts by weight of a phosphate ester (Strodex PK90). The resulting ink dispersion was then particle classified by centrifugation at 5000 rpm for 5 minutes and filtered through a 1.2 micron filter to remove large pigment particles. The final ink, adjusted to 5 percent pigment particles w/w by adding more deionized water, had a viscosity of 1.6 centipoise. This ink was incorporated into a thermal ink jet printing test fixture comprising a modified Xerox ® 4020 printer equipped with a 48 nozzle printhead capable of generating 300 spots per inch. Images were generated on two Xerox ® 4024 grade papers, namely paper and paper 10—Brazil XED518 and paper 10 smooth—Port Edwards—824-91—106 (both commercially available from Xerox Corporation). The drying times in seconds on both the felt side and the wire side of each of these papers are summarized in the following table.

| Brazil XED518 | | 10 Smooth PE-82491-106 | |
| --- | --- | --- | --- |
| Felt Side | Wire Side | Felt Side | Wire Side |
| 3 sec. | 4 sec. | 3 sec. | 4 sec. |

EXAMPLE VII

A pigment dispersion was prepared by adding 30 parts by weight of PV Fast Blue (pigment, obtained from American Hoechst Corporation), 7.5 parts by weight of Lomar D (dispersant, obtained from Diamond Shamrock Corporation) and 200 parts by weight of deionized water to a 01 Attritor (obtained from Union Process). The dispersion was attrited at 25° C. for 16 hours to disperse and break down the pigment particles to submicron size. The pigment dispersion was then diluted to 6 percent w/w by adding additional deionized water.

An ink composition was prepared by mixing 10 parts by weight of ethylene glycol, 90 parts by weight of the 6% pigment dispersion at room temperature, and 0.5 parts by weight of a phosphate ester (Strodex PK90). The resulting ink dispersion was then particle classified by centrifugation at 5000 rpm for 5 minutes and filtered through a 1.2 micron filter to remove large pigment particles. The final ink, adjusted to 5 percent pigment particles w/w by adding more deionized water, had a viscosity of 1.6 centipoise. This ink was incorporated into a thermal ink jet printing test fixture comprising a modified Xerox ® 4020 printer equipped with a 48 nozzle printhead capable of generating 300 spots per inch. Images were generated on two Xerox ® 4024 grade papers, namely paper and paper 10—Brazil XED518 and paper 10 smooth—Port Edwards—824-91—106 (both commercially available from Xerox Corporation). The drying times in seconds on both the felt side and the wire side of each of these papers are summarized in the following table.

| Brazil XED518 | | 10 Smooth PE-82491-106 | |
| --- | --- | --- | --- |
| Felt Side | Wire Side | Felt Side | Wire Side |
| 4 sec. | 5 sec. | 3 sec. | 3 sec. |

EXAMPLE VIII

A pigment dispersion was prepared by adding 30 parts by weight of Novaperm Yellow FGL (pigment, obtained from American Hoechst Corporation), 7.5 parts by weight of Lomar D (dispersant, obtained from Diamond Shamrock Corporation) and 200 parts by weight of deionized water to a 01 Attritor (obtained from Union Process). The dispersion was attrited at 25° C. for 16 hours to disperse and break down the pigment particles to submicron size. The pigment dispersion was then diluted to 6 percent w/w by adding additional deionized water.

An ink composition was prepared by mixing 10 parts by weight of ethylene glycol, 90 parts by weight of the 6% pigment dispersion at room temperature, and 0.5 parts by weight of a phosphate ester (Strodex PK90). The resulting ink dispersion was then particle classified by centrifugation at 5000 rpm for 5 minutes and filtered through a 1.2 micron filter to remove large pigment particles. The final ink, adjusted to 5 percent pigment particles w/w by adding more deionized water, had a viscosity of 1.6 centipoise. This ink was incorporated into a thermal ink jet printing test fixture comprising a modified Xerox® 4020 printer equipped with a 48 nozzle printhead capable of generating 300 spots per inch. Images were generated on two Xerox® 4024 grade papers, namely paper and paper 10—Brazil XED518 and paper 10 smooth—Port Edwards—824-91—106 (both commercially available from Xerox Corporation). The drying times in seconds on both the felt side and the wire side of each of these papers are summarized in the following table.

| Brazil XED518 | | 10-Smooth PE-82491-106 | |
|---|---|---|---|
| Felt side | Wire Side | Felt Side | Wire Side |
| 6 sec. | 5 sec. | 6 sec. | 5 sec. |

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition which comprises an aqueous liquid vehicle, a dye, and a phosphate ester selected from the group consisting of (a) compounds of the formula

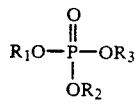

wherein $R_1$, $R_2$, and $R_3$ are independently selected from the group consisting of aliphatic hydrocarbon groups, and (b) compounds selected from the group consisting of $C_{12}H_{25}[OCH_2CH_2]_4OPO(OH)_2$, $(C_{12}H_{25}[OCH_2CH_2]_4O)_2PO(OH)$, $(C_{12}H_{25}[OCH_2CH_2]_4O)_3PO$, and mixtures thereof, said ink composition exhibiting a drying time of no more than 15 seconds when jetted onto plain paper in an ink jet printing process.

2. An ink composition according to claim 1 wherein the phosphate ester is present in an amount of from about 0.09 to about 1.5 percent by weight.

3. An ink composition according to claim 1 wherein the phosphate ester is present in an amount of from about 0.18 to about 0.5 percent by weight.

4. An ink composition according to claim 1 wherein the phosphate ester is of the formula

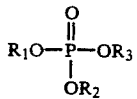

wherein $R_1$, $R_2$, and $R_3$ are independently selected from the group consisting of aliphatic hydrocarbon groups.

5. An ink composition according to claim 4 wherein the aliphatic hydrocarbon groups have from 1 to about 20 carbon atoms.

6. An ink composition according to claim 4 wherein the aliphatic hydrocarbon groups have from 1 to about 12 carbon atoms.

7. An ink composition according to claim 1 wherein the dye is present in an amount of from about 1 to about 10 percent by weight.

8. An ink composition according to claim 1 wherein the phosphate ester is of a formula selected from the group consisting of: $C_{12}H_{25}[OCH_2CH_2]_4OPO(OH)_2$ $(C_{12}H_{25}[OCH_2CH_2]_4O)_2PO(OH)$; $(C_{12}H_{25}[OCH_2CH_2]_4O)_3PO$; and mixtures thereof.

9. A process for generating images onto a substrate which comprises incorporating an ink composition which comprises an aqueous liquid vehicle, a dye, and a phosphate ester into an ink jet printing apparatus and causing droplets of the ink composition to be ejected in an imagewise pattern onto the substrate, said substrate being selected from the group consisting of paper, transparency materials, plastics, polymeric films, metals, and wood, wherein the image formed on the substrate dries in no more than 15 seconds.

10. A process according to claim 9 wherein the phosphate ester is present in an amount of from about 0.09 to about 1.5 percent by weight.

11. A process according to claim 9 wherein the phosphate ester is present in an amount of from about 0.18 to about 0.5 percent by weight.

12. A process according to claim 9 wherein the dye is present in an amount of from about 1 to about 10 percent by weight.

13. A process according to claim 9 wherein the ink jet printing apparatus employs a thermal ink jet printing process and droplets of ink are caused to be ejected by selectively heating the ink.

14. A process according to claim 9 wherein the substrate is selected from the group consisting of plain paper, coated paper, and transparency material.

15. A process according to claim 9 wherein the substrate is plain paper.

16. A process for generating images onto a substrate which comprises incorporating an ink composition which comprises an aqueous liquid vehicle, a dye, and a phosphate ester into an ink jet printing apparatus and causing droplets of the ink composition to be ejected in an imagewise pattern onto the substrate, wherein the phosphate ester is of the formula

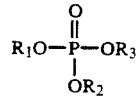

wherein $R_1$, $R_2$, and $R_3$ are independently selected from the group consisting of aliphatic hydrocarbon groups, wherein the image formed on the substrate dries in no more than 15 seconds.

17. A process according to claim 16 wherein the aliphatic hydrocarbon groups have from 1 to about 20 carbon atoms.

18. A process according to claim 16 wherein the aliphatic hydrocarbon groups have from 1 to about 12 carbon atoms.

19. A process for generating images onto a substrate which comprises incorporating an ink composition which comprises an aqueous liquid vehicle, a dye, and a phosphate ester into an ink jet printing apparatus and causing droplets of the ink composition to be ejected in an imagewise pattern onto the substrate, wherein the phosphate ester is of a formula selected from the group consisting of: $C_{12}H_{25}[OCH_2CH_2]_4OPO(OH)_2$; $(C_{12}H_{25}[OCH_2CH_2]_4O)_2PO(OH)$; $(C_{12}H_{25}[OCH_2CH_2]_4O)_3PO$; and mixtures thereof, wherein the image formed on the substrate dries in no more than 15 seconds.

* * * * *